(12) United States Patent
Tsubota

(10) Patent No.: US 8,288,006 B2
(45) Date of Patent: Oct. 16, 2012

(54) ARTIFICIAL LEATHER

(75) Inventor: Toshihiro Tsubota, Fukui (JP)

(73) Assignee: Seiren Co., Ltd., Fukui-shi (JP)

( * ) Notice: Subject to any disclaimer, the term of this patent is extended or adjusted under 35 U.S.C. 154(b) by 401 days.

(21) Appl. No.: 12/713,877

(22) Filed: Feb. 26, 2010

(65) Prior Publication Data

US 2010/0239846 A1    Sep. 23, 2010

(30) Foreign Application Priority Data

Mar. 1, 2009 (JP) ................................ 2009-075098

(51) Int. Cl.
*B32B 27/40* (2006.01)
*B32B 3/26* (2006.01)

(52) U.S. Cl. .................. 428/423.3; 428/318.6

(58) Field of Classification Search ............... 428/423.3, 428/318.6
See application file for complete search history.

(56) References Cited

U.S. PATENT DOCUMENTS 6,538,095 B2 * 3/2003 Imai et al. ...................... 528/59

2006/0079589 A1 * 4/2006 Tadokoro et al. ............. 521/155
2007/0169887 A1 * 7/2007 Kanagawa et al. ......... 156/331.7
2010/0093243 A1 * 4/2010 Uemura et al. ............... 442/304

FOREIGN PATENT DOCUMENTS

JP  09-239886  9/1997
JP  2002-249534  9/2002

* cited by examiner

*Primary Examiner* — Thao T. Tran
(74) *Attorney, Agent, or Firm* — Jordan and Hamburg LLP

(57) ABSTRACT

An artificial leather comprising a protective layer, a surface layer, and a fibrous substrate, successively laminated, wherein a polyurethane resin forming the surface layer is obtained by reacting a urethane polyisocyanate prepolymer (A) and a polyol component (C) containing a urethane polyol prepolymer (B), the (A) has an equivalent ratio (isocyanate groups/hydroxyl groups) of from 2.0 to 6.0, and has a number average molecular weight of from 3,000 to 30,000, the (B) has an equivalent ratio (isocyanate groups/hydroxyl groups) of from 0.2 to 0.8, and has a number average molecular weight of from 3,000 to 30,000, an equivalent ratio between the urethane polyisocyanate prepolymer (A) and the polyol component (C) (isocyanate groups/active hydrogen groups) is from 1.01 to 2.0, and a weight ratio between the urethane polyisocyanate prepolymer (A) and the polyol component (C) ((A)/(C)) is from 0.7 to 2.0.

15 Claims, No Drawings

ARTIFICIAL LEATHER

BACKGROUND OF THE INVENTION

The present invention relates to artificial leather. Particularly, the invention relates to artificial leather having excellent abrasion resistance, flex durability at low temperature and fastness to light.

Conventionally, artificial leather is used in various applications such as clothes, bags, shoes and interior materials, as a substitute for natural leather, or as a leather material having properties better than natural leather.

In order to obtain touch and feeling like natural leather, artificial leather is generally formed by appropriately selecting a resin layer comprising a polyurethane resin, such as a surface layer, a foamed layer or an adhesive layer, and laminating the resin layer on a substrate comprising a fibrous material (such as non-woven fabric, woven fabric or knitted fabric). A solvent type resin has mainly been used as the polyurethane resin. Recently, however, considering environmental problems, a technique of using a solventless resin is being studied.

For example, an example of artificial leather using a solventless resin includes a method of using a thermoplastic elastomer layer produced by a melt film-forming method as a resin layer comprising a polyurethane resin. Patent Document 1 discloses a laminate (artificial leather) having a porous layer containing bubbles, comprising a thermoplastic elastomer and produced by a melt film-forming method, on a surface of a fibrous substrate, and having a non-porous layer comprising a specific thermoplastic resin composition and produced by a melt film-forming method, on the porous layer, unevenness pattern or mirror pattern being present on the surface of the non-porous layer.

Other example of the artificial leather includes a method of using a solventless moisture-curing hot-melt polyurethane resin as a resin layer comprising a polyurethane resin. Patent Document 2 discloses a method of producing a polyurethane porous sheet-like structure (artificial leather) by heat-melting an isocyanate group-containing urethane prepolymer which is semi-solid or solid at ordinary temperatures, and a compound capable of reacting with an isocyanate group and/or a urethane curing catalyst, respectively, followed by stirring and mixing, and additionally introducing a gas, thereby performing mechanical foaming, applying or adhering the foamed material to a sheet-like material, and cooling to ordinary temperature.

Properties required in artificial leather include various items such as appearance very similar to natural leather, touch, soft feeling, peel strength, tear strength, abrasion resistance and flex durability at low temperature. Of those, abrasion resistance and flex durability at low temperature were difficult to be achieved simultaneously for the reason that requirements of a polyurethane resin satisfying those properties are contradictory.

The above-described conventional artificial leathers obtain the respective target effects, but did not simultaneously satisfy abrasion resistance and flex durability at low temperature.

Relevant prior art is:
[Patent Document 1] JP-A 9-239886
[Patent Document 2] JP-A 2002-249534

SUMMARY OF THE INVENTION

An object of the present invention is to provide a solventless artificial leather simultaneously satisfying abrasion resistance and flex durability at low temperature, and further having good fastness to light.

The artificial leather according to the present invention is an artificial leather comprising a protective layer comprising a polyurethane resin, a surface layer comprising a polyurethane resin, and a fibrous substrate, successively laminated, wherein the polyurethane resin forming the surface layer is obtained by reacting a urethane polyisocyanate prepolymer (A) and a polyol component (C) containing a urethane polyol prepolymer (B), the urethane polyisocyanate prepolymer (A) is obtained by reacting a polyisocyanate and a polyol in an equivalent ratio (isocyanate groups of polyisocyanate/hydroxyl groups of polyol) of from 2.0 to 6.0, and has a number average molecular weight of from 3,000 to 30,000, the urethane polyol prepolymer (B) is obtained by reacting a polyisocyanate and a polyol containing a polycarbonate polyol in an equivalent ratio (isocyanate groups of polyisocyanate/hydroxyl groups of polyol) of from 0.2 to 0.8, and has a number average molecular weight of from 3,000 to 30,000, an equivalent ratio between the urethane polyisocyanate prepolymer (A) and the polyol component (C) (isocyanate groups of (A)/active hydrogen groups of (C)) is from 1.01 to 2.0, and a weight ratio between the urethane polyisocyanate prepolymer (A) and the polyol component (C) (weight of (A)/weight of (C)) is from 0.7 to 2.0.

According to the present invention, artificial leather having small environmental load because of a solventless type which does not contain an organic solvent, simultaneously satisfying abrasion resistance and flex durability at low temperature, and having excellent fastness to light can be provided.

The artificial leather according to the present invention is an artificial leather comprising a protective layer comprising a polyurethane resin, a surface layer comprising a polyurethane resin, and a fibrous substrate, successively laminated, wherein the polyurethane resin forming the surface layer is obtained by reacting a urethane polyisocyanate prepolymer (A) and a polyol component (C) containing a urethane polyol prepolymer (B).

In general, the solventless polyurethane resin includes three kinds of (a) a moisture-curing type using a urethane polyisocyanate prepolymer, (b) a two-component curing type using a urethane polyisocyanate prepolymer and a polyol, and (c) a two-component curing type using a urethane polyol prepolymer and a polyisocyanate. Types (a) and (b) are that a urethane polyisocyanate prepolymer having a large number average molecular weigh increases its molecular weight by a urea bond and a biuret bond by a curing reaction with moisture, and additionally, the type (b) further increases its molecular weight by a urethane bond by a curing reaction with a polyol having a small number average molecular weight. For this reason, the polyurethane resin obtained has high strength and excellent abrasion resistance, but has the problems that feeling is coarse and hard, and flex durability at low temperature is poor. The type (c) is that a urethane polyol prepolymer having a large number average molecular weight increases its molecular weight by a urethane bond by a curing reaction with a polyisocyanate having a small number average molecular weight, and additionally, low molecular bonds are increased by a urea bond and a biuret bond by a curing reaction between a polyisocyanate and moisture. As a result, the polyurethane resin obtained has soft feeling and excellent flex durability at low temperature, but has the problems that strength is low and abrasion resistance is poor. Contrary to this, in the present invention, by a curing reaction between the urethane polyisocyanate prepolymer (A) having a number average molecular weight of from 3,000 to 30,000 and the polyol component (C) containing the urethane polyol prepolymer (B) having a number average molecular weight of from 3,000 to 30,000 in the above-described equivalent ratio and weight ratio, a polyurethane resin simultaneously satisfying abrasion resistance due to the urethane polyisocyanate prepolymer and flex durability at low temperature due to the urethane polyol prepolymer can be obtained. Furthermore, the prepolymer has a gentle molecular weight distribution (prepolymers having from a small molecular weight to a large molecular weight are present together) as compared with a polyisocyanate and a polyol, having the same molecular weight. For this reason, in the case that prepolymers having relatively large molecular weight were subjected to a curing reaction, soft feeling is obtained. In the case that prepolymers having relatively small molecular weight were subjected to a curing reaction, strength is improved. Thus, a resin layer obtained has good balance.

The fibrous substrate used in the present invention is not particularly limited, and can include fibrous fabrics such as woven fabric, knitted fabric and non-woven fabric, and natural leather. The fibrous substrate is appropriately selected according to the purpose. Kind of a fiber in the fibrous fabric is not particularly limited, and can include the conventional fibers such as natural fibers, regenerated fibers, semi-synthetic fibers and synthetic fibers. Those fibers may be used as mixtures of two kinds or more. Products obtained by applying the conventional solvent type or aqueous polymer compound, for example, a polyurethane resin or its copolymer, to the fibrous fabric or impregnating the fibrous fabric with the polymer compound, followed by dry coagulation or wet coagulation can be used. Of those, a knitted fabric comprising synthetic fibers, particularly a knitted fabric comprising polyester fibers, is preferably used from the points of strength and processability.

The artificial leather of the present invention is that the surface layer comprising a polyurethane resin obtained by reacting the urethane polyisocyanate prepolymer (A) and the polyol component (C) containing the urethane polyol prepolymer (B), as a first resin layer and a protective layer comprising a polyurethane resin, as a second resin layer are laminated on one side of the fibrous substrate.

The urethane polyisocyanate prepolymer (A) means a urethane prepolymer having an isocyanate group at the molecular terminal, and the urethane polyol prepolymer (B) means a urethane prepolymer having a hydroxyl group at the molecular terminal.

As conventionally known, the polyurethane resin is a generic name of a polymer compound having a urethane bond (—NHCOO—), and is generally produced by reacting a polyol and a polyisocyanate (crosslinking/curing reaction). A urethane prepolymer is obtained by stopping the reaction between a polyol and a polyisocyanate at an appropriate stage, and has a urethane bond in the main chain. The urethane polymer may be the urethane polyisocyanate prepolymer (A) having an isocyanate group at the molecular terminal, or the urethane polyol prepolymer (B) having a hydroxyl group at the molecular terminal, depending on the ratio between a polyol and a polyisocyanate at the time of production.

The polyol that can be used in producing the urethane polyisocyanate prepolymer (A) is not particularly limited, and examples thereof include polyester polyol, polyether polyol, polycarbonate polyol, acryl polyol, polyolefin polyol, castor oil polyol and silicone-modified polyol. Those can be used alone or as mixtures of two or more thereof. Of those, polyether polyol is preferred from the points that feeling is soft and flex durability at low temperature is good.

On the other hand, the polyisocyanate that can be used in producing the urethane polyisocyanate prepolymer (A) is not particularly limited, and examples thereof include aromatic diisocyanates such as phenylene diisocyanate, tolylene diisocyanate (TDI), 4,4'-diphenylmethane diisocyanate (MDI), 2,4'-diphenylmethane diisocyanate, naphthalene diisocyanate and xylylene diisocyanate; aliphatic diisocyanates or alicyclic diisocyanates, such as hexamethylene diisocyanate, lysine diisocyanate, cyclohexane diisocyanate, isophorone diisocyanate, dicyclohexylmethane diisocyanate and tetramethylxylylene diisocyanate; and polymeric MDI containing a dimer and a trimer of 4,4'-diphenylmethane diisocyanate (MDI). Of those, 4,4'-diphenylmethane diisocyanate (MDI) is preferred from the points that it is easy to control a curing reaction and resistance to chemicals is good.

Equivalent ratio of isocyanate group/hydroxyl group in reacting the polyisocyanate and the polyol is important to be from 2.0 to 6.0, and is preferably from 3.0 to 4.5. Where the equivalent ratio is less than 2.0, viscosity of the urethane polyisocyanate prepolymer (A) obtained is increased, resulting in deterioration of processability, and strength of the polyurethane resin obtained is low, resulting in deterioration of abrasion resistance of artificial leather. Where the equivalent ratio exceeds 6.0, feeling of the artificial leather obtained becomes hard, and flex durability at low temperature is deteriorated.

Production of the urethane polyisocyanate prepolymer (A) can use the conventional various methods, and is not particularly limited. For example, a method of mixing a water-removed polyol and a polyisocyanate, heating the resulting mixture and then reacting the mixture in a batchwise system, and a method of heating a water-removed polyol and a polyisocyanate, respectively, introducing those into an extruder in a given ratio, and reacting those in a continuous extrusion reaction system can be used.

The urethane polyisocyanate prepolymer (A) thus obtained is important to have a number average molecular weight of from 3,000 to 30,000. The number average molecular weight is preferably from 3,000 to 20,000, more preferably from 5,000 to 20,000, and further preferably from 5,000 to 10,000. Where the number average molecular weight is less than 3,000, flex durability at low temperature is deteriorated. Where the number average molecular weight exceeds 30,000, processability is deteriorated. In the present description, the number average molecular weight is a number average molecular weight (Mn) in terms of polyethylene glycol measured by gel permeation chromatography (GPC).

Melt viscosity at 80° C. of the urethane polyisocyanate prepolymer (A) thus obtained is preferably 50,000 cps or less, and more preferably 10,000 cps or less. Where the melt viscosity at 80° C. exceeds 50,000 cps, high temperature may be required to obtain viscosity suitable for processing, and workability may be deteriorated. The melt viscosity used herein was measured at 80° C. using a BM viscometer (manufactured by Tokyo Keiki Seisakusho).

The urethane polyol prepolymer (B) is described.

The polyol and the polyisocyanate that can be used in producing the urethane polyol prepolymer (B) are not particularly limited, and examples thereof include the same polyol and polyisocyanate used in the production of the urethane polyisocyanate prepolymer (A) described above. Those can be used alone or as mixtures of two kinds or more thereof. It is important for the polyol in producing the urethane polyol prepolymer (B) to contain a polycarbonate polyol. By using the polycarbonate polyol as at least a portion of the polyol, artificial leather having good fastness to light is obtained.

Furthermore, 4,4'-diphenylmethane diisocyanate (MDI) is preferred as the polyisocyanate in the point that it is easy to control a curing reaction.

Equivalent ratio of isocyanate group/hydroxyl group in reacting the polyisocyanate and the polyol is important to be from 0.2 to 0.8, and is preferably from 0.3 to 0.6. Where the equivalent ratio is less than 0.2, feeling of the artificial leather obtained becomes hard, and flex durability at low temperature is deteriorated. Where the equivalent ratio exceeds 0.8, viscosity of the urethane polyol prepolymer (B) obtained is increased, resulting in deterioration of processability, and strength of the polyurethane resin obtained is low, resulting in deterioration of abrasion resistance of artificial leather.

The production method of the urethane polyol prepolymer (B) can use the same conventional various methods as in the urethane polyisocyanate prepolymer (A) described above.

Number average molecular weight of the urethane polyol prepolymer (B) thus obtained is important to be from 3,000 to 30,000, and is preferably from 5,000 to 20,000, and more preferably from 7,000 to 15,000. Where the number average molecular weight is less than 3,000, flex durability at low temperature is deteriorated. Where the number average molecular weight exceeds 30,000, processability is deteriorated.

Melt viscosity at 80° C. of the urethane polyol prepolymer (B) thus obtained is preferably 50,000 cps or less, and more preferably 10,000 cps or less. Where the melt viscosity at 80° C. exceeds 50,000 cps, high temperature may be required to obtain viscosity suitable for processing, and workability may be deteriorated.

The polyol component (C) reacted with the urethane polyisocyanate prepolymer (A) may consist of the urethane polyol prepolymer (B). However, to improve abrasion resistance and flex durability at low temperature of artificial leather, an active hydrogen compound (D) such as a low molecular polyol (D1) and a chain extender (D2) may be used together.

In other words, by using the low molecular polyol (D1) as the polyol component (C) together with the urethane polyol prepolymer (B), a so-called soft segment component is increased, thereby flex durability at low temperature of the artificial leather obtained is improved.

The low molecular polyol (D1) is not particularly limited, and examples thereof include the same polyols as used in the productions of the urethane polyisocyanate prepolymer (A) and the urethane polyol prepolymer (B) described above. Those can be used alone or as mixtures of two kinds or more thereof. Of those, a polycarbonate polyol and a polyether polyol are preferred from the point that flex durability at low temperature is improved, and a polycarbonate polyol is more preferred in the point that flex durability at low temperature is improved without impairing durability such as abrasion resistance.

Number average molecular weight of the low molecular polyol (D1) is preferably from 500 to 2,000, and more preferably from 500 to 1,000. Where the number average molecular weight is less than 500, desired flex durability at low temperature may not be obtained. Where the number average molecular weight exceeds 2,000, strength of the polyurethane obtained may be low, and abrasion resistance may be deteriorated.

By using the chain extender (D2) as the polyol component (C) together with the urethane polyol prepolymer (B), bonding points of a polyurethane resin are increased, and abrasion resistance of the artificial leather obtained is improved.

The chain extender (D2) is not particularly limited, and includes low molecular compounds having a molecular weight of 400 or less and having at least two active hydrogen groups capable of reacting with isocyanate (groups containing a hydrogen atom capable of reacting with an isocyanate group, such as hydroxyl group and amino group) in one molecule. Examples of the chain extender include polyhydric alcohols such as ethylene glycol, 1,4-butanediol, propylene glycol, 1,6-hexanediol, 1,4-bis(2-hydroxyethoxy)benzene, bis(b-hydroxyethyl)terephthalate, xylylene glycol, glycerin and trimethylolpropane; and diamines such as ethylene diamine, propylene diamine, isophorone diamine, hydrazine, 4,4'-diaminodiphenyl methane, 4,4'-diaminodicyclohexyl methane and xylylene diamine. Those can be used alone or as mixtures of two kinds or more thereof. Of those, from the point that abrasion resistance is effectively improved, polyhydric alcohols are preferred, and 1,4-butanediol is particularly preferred.

If necessary, the polyol component (C) can contain additives such as urethanation catalysts, crosslinking agents, silane coupling agents, fillers, thixotropy-imparting agents, tackifiers, waxes, heat stabilizers, light stabilizers, fluorescent brighteners, foaming agents, thermoplastic resins, thermosetting resins, dyes, pigments, flame retardants, conductivity-imparting agents, antistatic agents, moisture permeability improvers, water repellents, oil repellents, hollow foams, crystallization water-containing compounds, water absorbents, moisture absorbents, deodorants, foam-controlling agents, defoamers, fungicides, preservatives, algaecides, pigment dispersants, inert gases, antiblocking agents, hydrolysis inhibitors and thickening agents, in a range that properties of the polyurethane resin obtained by curing are not impaired. Those additives can be used alone or as mixtures of two or more thereof. Of those, urethanation catalysts are preferably used to reduce process load and improve properties of artificial leather.

The surface layer comprising a polyurethane resin in the artificial leather of the present invention comprises a polyurethane resin formed by a curing reaction between the urethane polyisocyanate prepolymer (A) and the polyol component (C) containing the urethane polyol prepolymer (B). An equivalent ratio between an isocyanate group and an active hydrogen group in reacting the urethane polyisocyanate prepolymer (A) and the polyol component (C) (isocyanate group of (A)/active hydrogen group of (C)) is important to be from 1.01 to 2.0, and is preferably from 1.2 to 1.4. Where the equivalent ratio is less than 1.01, unreacted urethane polyol prepolymer (B) remains. As a result, strength of the polyurethane resin obtained by curing is low, resulting in deterioration of abrasion resistance. Where the equivalent ratio exceeds 2.0, a curing reaction proceeds excessively. As a result, feeling of the artificial leather obtained becomes coarse and hard, and flex durability at low temperature is deteriorated.

In the case that the polyol component (C) is the urethane polyol prepolymer (B) alone, the active hydrogen group is only a hydroxyl group. In the case that the polyol component (C) further contains the active hydrogen compound (D) capable of reacting with an isocyanate group, the amount of the active hydrogen group contained in (C) includes the amount of active hydrogen groups of hydroxyl groups and amino groups contained in the active hydrogen compound (D), in addition to the amount of the hydroxyl groups contained in the urethane polyol prepolymer (B).

A weight ratio in reacting the urethane polyisocyanate prepolymer (A) and the polyol component (C) containing the urethane polyol prepolymer (B) (weight of (A)/weight of (C)) is important to be from 0.7 to 2.0, and is preferably from 0.8 to 2.0, more preferably from 0.8 to 1.8, and further preferably from 1.0 to 1.25. Where the weight ratio is less than 0.7, strength of the polyurethane resin obtained by curing is low, resulting in deterioration of abrasion resistance. Where the weight ratio exceeds 2.0, feeling of the artificial leather becomes coarse and hard, and flex durability at low temperature is deteriorated.

In the case that the polyol component (C) contains the active hydrogen compound (D) capable of reacting with an isocyanate group, the weight of (C) includes weight of (D). Even in the case that additives which do not contain an active hydrogen group are added to the polyol component (C), the additives are not the polyol component (C) itself, and therefore, the weight of the additives is not included in the weight of (C).

Proportion of the urethane polyol prepolymer (B) in the polyol component (C) is preferably 50% by weight or more. In more detail, in the case that the polyol component (C) contains the active hydrogen compound (D), the weight ratio of the active hydrogen compound (D) and the urethane polyol prepolymer (B) (weight of (D)/weight of (B)) is preferably from 0.01 to 1.0, and more preferably from 0.04 to 0.5. Strength of the polyurethane resin obtained by curing can be increased and abrasion resistance can further be improved, by that the weight ratio is 0.01 or more. Where the weight ratio exceeds 1.0, feeling of the artificial leather obtained may become coarse and hard, and flex durability at low temperature may be deteriorated.

The surface layer comprising the polyurethane resin thus obtained simultaneously satisfies abrasion resistance and flex durability at low temperature, and further can make artificial leather having excellent fastness to light.

The surface layer comprising the polyurethane resin converts to a porous layer by a carbon dioxide gas generated by reacting a part of an isocyanate group of the urethane polyisocyanate prepolymer (A) with moisture in the atmosphere. Thickness of the surface layer comprising the polyurethane resin is preferably from 50 to 350 mm, and more preferably from 100 to 200 mm. Where the thickness is less that 50 mm, abrasion resistance may be deteriorated. Where the thickness exceeds 350 mm, feeling of the artificial leather obtained may become coarse and hard.

The artificial leather of the present invention comprises a fibrous substrate, a surface layer comprising a polyurethane resin, laminated on one side of the fibrous substrate, and a protective layer comprising a polyurethane resin, laminated as a second resin layer on the surface of the surface layer. By this constitution, abrasion resistance of artificial leather is improved. In the present invention, the protective layer means a generic name of a resin layer as an outermost layer formed on the surface of the surface layer and protecting the surface layer, and comprises at least one resin layer. However, the protective layer can comprise at least two resin layers having the same or different composition.

The polyurethane resin used in the formation of the protective layer is not particularly limited, and can include a polyether type polyurethane resin, a polyester type polyurethane resin and a polycarbonate type polyurethane resin. Those resins can be used alone or as mixtures of two or more thereof. Of those, a polycarbonate type polyurethane resin is preferred from the points of abrasion resistance and fastness to light. Form of the polyurethane resin is not limited, and any polyurethane resins can be used, regardless of a solventless type, a hot-melt type, a solvent type and an aqueous type, and regardless of one-component type and two-component curing type. The polyurethane resin can appropriately be selected according to the purpose and the use.

If necessary, the polyurethane resin of the protective layer can contain optional components such as urethanation catalysts, crosslinking agents, silane coupling agents, fillers, thixotropy-imparting agents, tackifiers, waxes, heat stabilizers, light stabilizers, fluorescent brighteners, foaming agents, thermoplastic resins, thermosetting resins, dyes, pigments, flame retardants, conductivity-imparting agents, antistatic agents, moisture permeability improvers, water repellents, oil repellents, hollow foams, crystallization water-containing compounds, water absorbents, moisture absorbents, deodorants, foam-controlling agents, defoamers, fungicides, preservatives, algaecides, pigment dispersants, inert gases, antiblocking agents, hydrolysis inhibitors, delusterants, touch improvers, slip modifiers and thickening agents, in a range that properties of the polyurethane resin are not impaired. Those optional components can be used alone or as mixtures of two or more thereof.

Thickness of the protective layer is preferably from 10 to 100 mm, and more preferably from 20 to 50 mm. Where the thickness is less than 10 mm, abrasion resistance may be deteriorated, and it may be difficult to uniformly form the protective layer. As a result, the protective layer may partially lack. Where the thickness exceeds 100 mm, flex durability at low temperature may be deteriorated, and touch and feeling of the artificial leather may become coarse and hard.

A method for producing artificial leather of the present invention is described. The production method includes:

a step of preparing a prepolymer composition by mixing a urethane polyisocyanate prepolymer (A) in a heated state and a polyol component (C) containing a urethane polyol prepolymer (B) in a heated state; and a step of forming a surface layer comprising a polyurethane resin by [1] applying the prepolymer composition in a heated state to a fibrous substrate, or [2] applying the composition to a releasable substrate, and boding a fibrous substrate to the surface applied with the composition.

In [2] above, the prepolymer composition may directly be applied to the releasable substrate (embodiment (2) described below), or a protective layer is formed on the releasable substrate and the prepolymer composition may be applied thereto (embodiment (3) described below), so long as the prepolymer composition is applied to the releasable substrate.

In more detail, the artificial leather can be produced by, for example, the following method.

(1) A prepolymer composition obtained by mixing the urethane polyisocyanate prepolymer (A) in a heated state, and the polyol component (C) containing the urethane polyol prepolymer (B) in a heated state is applied to a fibrous substrate, and a releasable substrate is bonded to the surface applied with the prepolymer composition during the state that the prepolymer composition has viscosity. The resulting assembly is cooled to room temperature, followed by aging treatment, thereby forming a surface layer. The releasable substrate is then peeled, a composition containing a polyurethane resin is applied to the exposed surface of the surface layer, if necessary, followed by heat treatment and aging treatment, thereby forming a protective layer (one embodiment of [1] above).

(2) A prepolymer composition obtained by mixing the urethane polyisocyanate prepolymer (A) in a heated state, and the polyol component (C) containing the urethane polyol prepolymer (B) in a heated state is applied to a releasable substrate, and a fibrous substrate is bonded to the surface applied with the prepolymer composition during the state that the prepolymer composition has viscosity. The resulting assembly is cooled to room temperature, followed by aging treatment, thereby forming a surface layer. The releasable substrate is then peeled, a composition containing a polyurethane resin is applied to the exposed surface of the surface layer, if necessary, followed by heat treatment and aging treatment, thereby forming a protective layer (one embodiment of [2] above).

(3) A composition containing a polyurethane resin is applied to a releasable substrate, if necessary, followed by heat treatment and aging treatment, thereby forming a protective layer. A prepolymer composition obtained by mixing the urethane polyisocyanate prepolymer (A) in a heated state, and the polyol component (C) containing the urethane polyol prepolymer (B) in a heated state is applied to the surface of the protective layer, and a fibrous substrate is bonded to the surface applied with the prepolymer composition during the state that the prepolymer composition has viscosity. The resulting assembly is cooled to room temperature, followed by aging treatment, thereby forming a surface layer. The releasable substrate is finally peeled (one embodiment of [2] above).

Of (1) to (3) above, the method (2) is preferred in that a protective layer of a thin film can be formed, and a surface layer having a uniform thickness can be formed. The production method is described below by reference to the method (2), but various explanatory items such as an application method and a heat treatment of a resin are basically the common items even in the case of using the methods (1) and (3).

First, to form a surface layer, a prepolymer composition is produced.

The urethane polyisocyanate prepolymer (A) is adjusted to have viscosity of good processability, preferably a range of from 1,000 to 20,000 cps, and more preferably a range of from 1,000 to 10,000 cps, in a raw material tank capable of controlling a temperature. Where the viscosity is less than 1,000 cps, desired properties (particularly flex durability at low temperature) may not be obtained. Where the viscosity exceeds 20,000 cps, processability may be deteriorated. Heating temperature is set to a range of generally from 40 to 150° C., and preferably from 70 to 100° C. Where the heating temperature is too low, a desired viscosity may not be achieved, and processability may be deteriorated. Where the heating temperature is too high, a prepolymer may be deteriorated by heat.

The polyol component (C) containing the urethane polyol prepolymer (B) is similarly adjusted to have viscosity of good processability, preferably a range of from 1,000 to 20,000 cps, and more preferably a range of from 1,000 to 10,000 cps, in a raw material tank capable of controlling a temperature, if necessary, by adding and mixing the above additives and heating. Where the viscosity is less than 1,000 cps, desired properties (particularly flex durability at low temperature) may not be obtained. Where the viscosity exceeds 10,000 cps, processability may be deteriorated. Heating temperature is set to a range of generally from 30 to 150° C., and preferably from 40 to 120° C.

A mixing head having a structure capable of heating and heat-retaining is used for mixing the urethane polyisocyanate prepolymer (A) and the polyol component (C) in a heated state. Those materials are mixed in a given ratio and stirred. The resulting mixture is then fed to an application apparatus.

A method for applying the prepolymer composition to the releasable substrate can use the conventional various methods, and is not particularly limited. For example, methods using apparatuses such as spray coater, roll coater, knife coater, comma coater or T-die coater can be used. Of those, application by knife coater or comma coater is preferably used in the point that a uniform thin film layer can be formed.

The releasable substrate used in the present invention is not particularly limited, and can include a film comprising a resin itself (for example, olefin resin, silicone resin and fluorine resin; hereinafter referred to as a "release agent") having releasability to the polyurethane resin; and a release paper, a release cloth, a release film and the like, obtained by laminating a release layer comprising the release agent on a substrate such as a paper, a cloth or a film. The releasable substrate may have unevenness patterns, and by using such a releasable substrate, design properties can be imparted to the surface of the artificial leather.

Application thickness of the prepolymer composition is preferably from 25 to 300 mm, and more preferably from 50 to 200 mm. By setting the application thickness to this range, the surface layer having the thickness of from 1.1 to 2 times, and preferably from 1.2 to 1.5 times, the application thickness can be obtained, resulting in the surface layer having a thickness of preferably from 50 to 350 mm, and more preferably from 100 to 200 mm.

After applying the prepolymer composition to the releasable substrate, heat treatment is preferably conducted. Curing reaction between the urethane polyisocyanate prepolymer (A) and the polyol component (C) containing the urethane polyol prepolymer (B) proceeds at ordinary temperature, and therefore, heat treatment is not always required. However, the curing reaction is accelerated by heat treatment. Therefore, it is preferred to conduct heat treatment from the point of production efficiency.

Heat treatment temperature in this case can appropriately be selected depending on the prepolymers and the polyols selected, additives optionally used, application thickness and the like. The heat treatment temperature is preferably from 60 to 150° C., and more preferably from 80 to 130° C. Where the heat treatment temperature is less than 60° C., reaction acceleration effect by conducting heat treatment may not sufficiently be obtained. Where the heat treatment temperature exceeds 150° C., it may be impossible to control curing reaction, and processing stability may be deficient. Heat treatment time is preferably from 30 seconds to 5 minutes, and more preferably from 1 to 3 minutes. Where the heat treatment time is less than 30 seconds, reaction acceleration effect by conducting heat treatment may not sufficiently be obtained. Where the heat treatment time exceeds 5 minutes, curing reaction may proceed excessively, and adhesion to a fibrous substrate may be deteriorated.

Next, during the state that the prepolymer composition (a part thereof undergoes curing reaction to form a polyurethane resin) has viscosity, a fibrous substrate is bonded to the prepolymer composition, and the resulting assembly is cooled to room temperature, followed by aging treatment. Thus, a surface layer is formed.

Reaction rate between the urethane polyisocyanate prepolymer (A) and the polyol component (C) containing the urethane polyol prepolymer (B) greatly varies depending on a kind and an amount of the prepolymers and the polyols selected, and additives (particularly urethanation catalysts) optionally used. Therefore, it is necessary to appropriately set aging treatment conditions depending on the conditions selected. In general, the aging treatment is conducted at room temperature for from about 1 day to about 1 week. This process completes a curing reaction between the urethane polyisocyanate prepolymer (A) and the polyol component (C) containing the urethane polyol prepolymer (B). Where the curing reaction is incomplete, properties such as abrasion resistance may be poor.

The releasable substrate is then peeled, and the protective layer comprising a polyurethane resin is formed on the surface layer.

A method for applying the polyurethane resin composition to the surface layer to form a protective layer can use the conventional various methods, and is not particularly limited. For example, methods using apparatuses such as reverse roll coater, spray coater, roll coater, gravure coater, kiss roll coater, knife coater, comma coater and T-die coater can be used. Of those, application by reverse roll coater, knife coater or comma coater is preferably used in the point that a uniform thin film layer can be formed. Application thickness of the polyurethane resin composition is appropriately determined according to a thickness of the protective layer.

If necessary, heat treatment is then conducted. The heat treatment is conducted to evaporate a solvent in the polyurethane resin composition and dry a resin. In the case of using a crosslinking agent causing a crosslinking reaction by heat treatment and in the case of using a two-component curing type resin, the heat treatment is conducted to accelerate a reaction, thereby forming a coating film having sufficient strength. The heat treatment temperature is preferably from 50 to 150° C., and more preferably from 60 to 120° C. Where the heat treatment temperature is less than 50° C., the heat treatment may require much time. As a result, process load may be increased, and crosslinking of a resin may be insufficient, thereby abrasion resistance may be poor. Where the heat treatment temperature exceeds 150° C., feeling of artificial leather may be coarse and hard. Heat treatment time is preferably from 2 to 20 minutes, and more preferably from 2 to 10 minutes. Where the heat treatment time is less than 2 minutes, crosslinking of a resin may be insufficient, and abrasion resistance may be poor. Where the heat treatment time exceeds 20 minutes, processing rate may be slow, and process load may be increased.

In the case of using a hot-melt type resin as the polyurethane resin, the protective layer can be formed by applying a heat-melted resin to a surface layer and then cooling, and heat treatment is unnecessary.

If necessary, aging treatment is further conducted, thereby completing the above reaction. Thus, a protective layer is formed on the surface layer, and the artificial leather of the present invention can be obtained.

DETAILED DESCRIPTION OF THE INVENTION

The present invention is described in more detail below by reference to Examples, but the invention is not construed as being limited to the Examples. "Parts" in the Examples are by weight. The artificial leather obtained was evaluated according to the following method.

[Abrasion Resistance]

One test piece having a width of 70 mm and a length of 300 mm was collected from a longitudinal direction and a lateral direction of artificial leather, respectively. Urethane foam having a width of 70 mm, a length of 300 mm and a thickness of 10 mm was fitted to the back of the test piece. A wire having a diameter of 4.5 mm was provided at a lower surface center of the urethane foam. Load of 9.8N was applied to a friction element covered with cotton cloth over the wire in parallel to the wire, and the test piece was abraded with the friction element. The friction element was reciprocated on the surface of the test piece 25,000 times with a distance of 140 mm at a speed of 60 reciprocations/min for abrasion. Appearance of the test piece after abrasion was evaluated according to the following standard. Grade 4 or more was indicated by "™", grade 3 was indicated by "r", and grade 2 or less was indicated by "î".

Grade 5: No change on appearance
Grade 4: Abrasion is slightly seen, but is not remarkable.
Grade 3: Abrasion is clearly seen, and exposure of fibrous substrate is seen.
Grade 2: Exposure of fibrous substrate is slightly remarkable.
Grade 1: Exposure of fibrous substrate is remarkable.

[Flex Durability at Low Temperature]

Three test pieces, each having a width of 40 mm and a length of 70 mm, were collected from a longitudinal direction and a lateral direction of artificial leather, respectively. The respective test pieces were folded in a longitudinal direction such that the front surface (protective layer side) faces outward. Using De Mattie type flexing tester (manufactured by Ueshima Seisakusho Co., Ltd.), each test piece was subjected to a flexing test 30,000 times under environment of −10° C. at a grip distance of 30±0.2 mm, a stroke of 15 mm and a speed of 100 times/min. Appearance of the test piece after the flexing test was evaluated according to the following standard. Grade 4 or more was indicated by "™", grade 3 was indicated by "r", and grade 2 or less was indicated by "î".

Grade 5: No change on appearance
Grade 4: Flexing trace is seen on surface, but is not remarkable.
Grade 3: Flexing trace is seen on surface, and although breakage is not seen, but whitening is seen.
Grade 2: Breakage occurs, and exposure of fibrous substrate is slightly remarkable (breakage is 10 mm or less).
Grade 1: Breakage occurs, and exposure of fibrous substrate is remarkable (breakage is more than 10 mm).

[Fastness to Light]

A test piece having a width of 50 mm and a length of 50 mm was subjected to a test under the following conditions using a light fastness tester equipped with a metal halide lamp (water-cooling type): EYE SUPER UV TESTER, SUV-F11 (manufactured by Iwasaki Electric Co., Ltd.).

| | |
|---|---|
| Irradiation total dose | 80 MJ/m² |
| Irradiation intensity | 100 mW/cm² |
| Temperature | 70 ± 2° C. |
| Cycle time | 24 hours |

The test piece before and after irradiation was visually observed. The test piece after irradiation was graded using a gray scale of JIS L-0804, and evaluated according to the following standard.

™: Grade 4 or more
r: Grade 3 or more and less than Grade 4
î: Less than Grade 3

Urethane prepolymer was produced as follows.

Production Example A1

100 parts of a polyether polyol having a number average molecular weight of 1,000 (PTMG1000, manufactured by Sanyo Chemical Industries, Ltd.) and 88 parts of 4,4'-diphenylmethane diisocyanate (MDI) were placed in a 1 liter four-necked flask maintained at 60° C., and stirred at 80° C. until disappearing hydroxyl groups (equivalent ratio (isocyanate group/hydroxyl group) is 3.5). Thus, a urethane polyisocyanate prepolymer was obtained (number average molecular weight: 3,250).

Production Examples A2 to A10

Urethane polyisocyanate prepolymers were obtained in the same procedures as in Production Example A1 according to Table 1.

TABLE 1

Urethane polyisocyanate prepolymer

| | Polyol | | | | | Polyisocyanate | | Equivalent ratio NCO/OH | Number average molecular weight | Viscosity at 80° C. |
|---|---|---|---|---|---|---|---|---|---|---|
| | | | | Molecular weight | Amount (parts) | Molecular weight | Amount (parts) | | | |
| Production Example A1 | PTMG1000 | Sanyo Chemical Industries, Ltd. | Polyether polyol | 1000 | 100 | MDI | 250 | 88 | 3.52 | 3250 | 1000 |
| Production Example A2 | Kuraray Polyol C1090 | Kuraray Co., Ltd. | Polycarbonate polyol | 1000 | 100 | MDI | 250 | 88 | 3.52 | 3570 | 1500 |
| Production Example A3 | PTMG2000 | Sanyo Chemical Industries, Ltd. | Polyether polyol | 2000 | 200 | MDI | 250 | 88 | 3.52 | 9200 | 3500 |
| Production Example A4 | PTMG2000 | Sanyo Chemical Industries, Ltd. | Polyether polyol | 2000 | 350 | MDI | 250 | 88 | 2.01 | 12700 | 8000 |
| Production Example A5 | PTMG2000 | Sanyo Chemical Industries, Ltd. | Polyether polyol | 2000 | 117 | MDI | 250 | 88 | 6.02 | 5800 | 1200 |
| Production Example A6 | PTMG1000 | Sanyo Chemical Industries, Ltd. | Polyether polyol | 1000 | 100 | MDI | 250 | 131 | 3.49 | 7600 | 2200 |
| | PTMG2000 | Sanyo Chemical Industries, Ltd. | Polyether polyol | 2000 | 100 | | | | | | |
| Production Example A7 | PTMG1000 | Sanyo Chemical Industries, Ltd. | Polyether polyol | 2000 | 470 | MDI | 250 | 88 | 1.50 | 10300 | 12500 |
| Production Example A8 | PTMG2000 | Sanyo Chemical Industries, Ltd. | Polyether polyol | 2000 | 100 | MDI | 250 | 88 | 7.04 | 5200 | 1000 |
| Production Example A9 | PTMG500 | Sanyo Chemical Industries, Ltd. | Polyether polyol | 500 | 50 | MDI | 250 | 88 | 3.52 | 2500 | 600 |
| Production Example 10 | PTMG3000 | Sanyo Chemical Industries, Ltd. | Polyether polyol | 3000 | 100 | MDI | 250 | 17 | 2.00 | 21000 | 17000 |

Production Example B1

100 parts of a polycarbonate polyol having a number average molecular weight of 1,000 (Kuraray Polyol C1090, manufactured by Kuraray Co., Ltd.) were placed in a 1 liter four-necked flask maintained at 60° C., and stirred. 15 parts of 4,4-diphenylmethane diisocyanate (MDI) were placed in the flask, and the resulting mixture was stirred at 80° C. until disappearing isocyanate groups (equivalent ratio (isocyanate group/hydroxyl group) is 0.60). Thus, a urethane polyol prepolymer was obtained (number average molecular weight: 8,086).

Production Examples B2 to B11

Urethane polyol prepolymers were obtained in the same procedures as in Production Example B1 according to Table 2.

TABLE 2

Urethane polyol prepolymer

| | Polyol | | | | | Polyisocyanate | | Equivalent ratio NCO/OH | Number average molecular weight | Viscosity at 80° C. |
|---|---|---|---|---|---|---|---|---|---|---|
| | | | | Molecular weight | Amount (parts) | Molecular weight | Amount (parts) | | | |
| Production Example B1 | Kuraray Polyol C1090 | Kuraray Co., Ltd. | Polycarbonate polyol | 1000 | 100 | MDI | 250 | 15 | 0.60 | 8086 | 28000 |
| Production Example B2 | Kuraray Polyol C590 | Kuraray Co., Ltd. | Polycarbonate polyol | 500 | 100 | MDI | 250 | 15 | 0.30 | 3512 | 2700 |
| Production Example B3 | Kuraray Polyol C2090 | Kuraray Co., Ltd. | Polycarbonate polyol | 2000 | 400 | MDI | 250 | 15 | 0.30 | 13200 | 8500 |
| Production Example B4 | Kuraray Polyol C2090 | Kuraray Co., Ltd. | Polycarbonate polyol | 2000 | 150 | MDI | 250 | 15 | 0.80 | 20500 | 36000 |
| Production Example B5 | Kuraray Polyol C2090 | Kuraray Co., Ltd. | Polycarbonate polyol | 2000 | 590 | MDI | 250 | 15 | 0.20 | 10300 | 5100 |
| Production Example B6 | Kuraray Polyol C2090 | Kuraray Co., Ltd. | Polycarbonate polyol | 2000 | 100 | MDI | 250 | 19 | 0.30 | 7900 | 3600 |
| | Kuraray Polyol C590 | Kuraray Co., Ltd. | Polycarbonate polyol | 500 | 100 | | | | | | |
| Production Example B7 | Kuraray Polyol C2090 | Kuraray Co., Ltd. | Polycarbonate polyol | 2000 | 134 | MDI | 250 | 15 | 0.90 | 24400 | 50000↑ |
| Production Example B8 | Kuraray Polyol C2090 | Kuraray Co., Ltd. | Polycarbonate polyol | 2000 | 1200 | MDI | 250 | 15 | 0.10 | 7400 | 3200 |
| Production Example B9 | PPG1000 | Sanyo Chemical Industries, Ltd. | Polyether polyol | 1000 | 100 | MDI | 250 | 15 | 0.60 | 7800 | 1000 |
| Production Example B10 | Kuraray Polyol C590 | Kuraray Co., Ltd. | Polycarbonate polyol | 500 | 100 | MDI | 250 | 10 | 0.20 | 2100 | 1800 |

TABLE 2-continued

| | | | Urethane polyol prepolymer | | | | | | | |
|---|---|---|---|---|---|---|---|---|---|---|
| | | | Polyol | | | Polyisocyanate | | Equivalent ratio NCO/OH | Number average molecular weight | Viscosity at 80° C. |
| | | | | Molecular weight | Amount (parts) | Molecular weight | Amount (parts) | | | |
| Production Example B11 | PPG2000 | Sanyo Chemical Industries, Ltd. | Polyether polyol | 2000 | 100 | MDI | 250 | | | |
| | Kuraray Polyol C2090 | Kuraray Co., Ltd. | Polycarbonate polyol | 2000 | 100 | | | | | |

Example 1

| Formulation 1 | |
|---|---|
| Urethane polyisocyanate prepolymer (A1) of Production Example A1 | 100 parts |
| Urethane polyol prepolymer (B1) of Production Example B1 | 100 parts |
| Carbon black pigment (POLYTON BLACK, manufactured by DIC Corporation) | 2 parts |
| Amine type urethanation catalyst (TOYOCAT-DT, manufactured by Tosoh Corporation) | 1 part |

Equivalent ratio (isocyanate group of A1/hydroxyl group of B1) = 1.71
Weight ratio (weight of A1/weight of B1) = 1

(Preparation method: A carbon black pigment and an amine type urethanation catalyst were added to the urethane polyol prepolymer (B1) heated to 60° C., followed by stirring and dispersing. The urethane polyisocyanate prepolymer (A1) heated to 40° C. was then added and stirred, and the resulting mixture is immediately subjected to an application operation.)

| Formulation 2 | |
|---|---|
| Delusterant: LLC WL Mat UM-2509 | 550 parts |
| Urethane resin: LLC WL Clear UX-2009 | 150 parts |
| Touch improver (silicone): LLC WL Conditioner SL-5 | 60 parts |
| Slip modifier (silicone): LLC WL Conditioner SL-6 | 20 parts |
| Crosslinking agent: LLC WL Fixer UX-10 | 225 parts |
| Thickening agent: LLC Thicker NA-2 | Appropriate amount |
| Water | About 110 parts |

The above components all are products by DIC Corporation except for water. The total amount is about 1,115 parts, and viscosity was adjusted to 2,000 cps (23° C.) by about 110 parts of water and a slight amount of the thickening agent.

The prepolymer composition prepared according to Formulation 1 above was applied to a release paper having grained unevenness pattern (R-51, manufactured by Lintec Corporation) with a comma coater in a sheet form such that an application thickness was 250 mm. After heat treating at 80° C. for 5 minutes with a drier, a polyester tricot fabric was bonded to the prepolymer composition during the state that the prepolymer composition had viscosity. The resulting assembly was pressed with a mangle under a load of 5 kg/cm² and then subjected to aging treatment in an atmosphere at a temperature of 23° C. and a relative humidity of 65% for 1 day, thereby forming a surface layer having a thickness of 300 mm. The release paper was peeled, and a laminate of a fibrous substrate and the surface layer was obtained.

The polyurethane resin composition prepared according to Formulation 2 above was applied to the surface of the surface layer of the laminate obtained above with a reverse coater in a sheet form such that an application thickness was 70 mm, followed by heat treatment at 100° C. for 5 minutes with a drier. Thus, artificial leather of Example 1 was obtained.

[Examples 2 to 14] and [Comparative Examples 1 to 10]

Artificial leathers were obtained in the same procedures as in Example 1 according to Tables 3 to 5. Comparative Example 1 was that application of the prepolymer composition for a surface layer was poor, and therefore, the artificial leather was not evaluated. In Tables 3 to 5, "PTMG500" means a polyether polyol manufactured by Sanyo Chemical Industries, Ltd., "C1050" means a polycarbonate polyol (trade name: Kuraray Polyol C1050) manufactured by Kuraray Corporation, "C2090" means a polycarbonate polyol (trade name: Kuraray Polyol C2090) manufactured by Kuraray Corporation, "1,4-BD" means 1,4-butanediol, and "1,3-PD" means 1,3-propanediol.

TABLE 3

| | | | Example | | | | | | |
|---|---|---|---|---|---|---|---|---|---|
| | | | 1 | 2 | 3 | 4 | 5 | 6 | 7 |
| | A | Urethane polyisocyanate prepolymer | A1 | A1 | A1 | A1 | A1 | A2 | A3 |
| | | Number average molecular weight | 3250 | 3250 | 3250 | 3250 | 3250 | 3570 | 9200 |
| | | Equivalent ratio (NCO/OH) | 3.52 | 3.52 | 3.52 | 3.52 | 3.52 | 3.52 | 3.52 |
| | | Amount (parts) | 100 | 100 | 100 | 100 | 100 | 100 | 100 |
| C | B | Urethane polyol prepolymer | B1 | B1 | B1 | B2 | B1 | B1 | B3 |

TABLE 3-continued

|  |  |  | Example |  |  |  |  |  |  |
|---|---|---|---|---|---|---|---|---|---|
|  |  |  | 1 | 2 | 3 | 4 | 5 | 6 | 7 |
|  |  | Number average molecular weigh | 8086 | 8086 | 8086 | 3512 | 8086 | 8086 | 13200 |
|  |  | Equivalent ratio (NCO/OH) | 0.60 | 0.60 | 0.60 | 0.30 | 0.60 | 0.60 | 0.30 |
|  |  | Amount (parts) | 100 | 96 | 70 | 49 | 75 | 96 | 98 |
|  | D1 | Polyol |  |  | PTMG500 |  |  |  |  |
|  |  | Molecular weight |  |  | 500 |  |  |  |  |
|  |  | Amount (parts) |  |  | 26 |  |  |  |  |
|  | D2 | Polyol |  | 1,4-BD | 1,4-BD | 1,4-BD | 1,3-PD | 1,4-BD | 1,4-BD |
|  |  | Molecular weight |  | 90 | 90 | 90 | 76 | 90 | 90 |
|  |  | Amount (parts) |  | 4 | 4 | 1 | 5 | 4 | 2 |
|  |  | Equivalent ratio of A and C NCO/OH | 1.71 | 1.32 | 1.06 | 1.99 | 1.23 | 1.31 | 1.31 |
|  |  | Weight ratio A/C | 1.00 | 1.00 | 1.00 | 2.00 | 1.25 | 1.00 | 1.00 |
|  |  | Weight ratio D/B | 0 | 0.04 | 0.43 | 0.02 | 0.07 | 0.04 | 0.02 |
| Evaluation |  | Abrasion resistance | ○ (Grade 4) | ○ (Grade 4) | ○ (Grade 4) | ○ (Grade 4) | ○ (Grade 4) | ○ (Grade 4) | ○ (Grade 4) |
|  |  | Flex durability at low temperature | ○ (Grade 4) | ○ (Grade 4) | ○ (Grade 4) | ○ (Grade 4) | ○ (Grade 4) | ○ (Grade 4) | ○ (Grade 4) |
|  |  | Fastness to light | ○ (Grade 4) | ○ (Grade 4) | ○ (Grade 4) | ○ (Grade 4) | ○ (Grade 4) | ○ (Grade 4) | ○ (Grade 4) |

TABLE 4

|  |  |  | Example |  |  |  |  |  |  |
|---|---|---|---|---|---|---|---|---|---|
|  |  |  | 8 | 9 | 10 | 11 | 12 | 13 | 14 |
| A |  | Urethane polyisocyanate prepolymer | A4 | A5 | A1 | A1 | A6 | A10 | A1 |
|  |  | Number average molecular weight | 12700 | 5800 | 3250 | 3250 | 7600 | 21000 | 3250 |
|  |  | Equivalent ratio (NCO/OH) | 2.01 | 6.02 | 3.52 | 3.52 | 3.49 | 2.00 | 3.52 |
|  |  | Amount (parts) | 100 | 100 | 100 | 100 | 100 | 100 | 100 |
| C | B | Urethane polyol prepolymer | B4 | B5 | B1 | B3 | B6 | B11 | B1 |
|  |  | Number average molecular weigh | 20500 | 10300 | 8086 | 13200 | 7900 | 23200 | 8086 |
|  |  | Equivalent ratio (NCO/OH) | 0.80 | 0.20 | 0.60 | 0.30 | 0.30 | 0.80 | 0.60 |
|  |  | Amount (parts) | 99 | 95 | 67 | 95 | 47 | 100 | 120 |
|  | D1 | Polyol | PTGM500 |  | C1050 |  |  |  |  |
|  |  | Molecular weight | 500 |  | 1000 |  |  |  |  |
|  |  | Amount (parts) | 1 |  | 33 |  |  |  |  |
|  | D2 | Polyol |  | 1,4-BD |  | 1,4-BD | 1,4-BD |  |  |
|  |  | Molecular weight |  | 90 |  | 90 | 90 |  |  |
|  |  | Amount (parts) |  | 5 |  | 5 | 3 |  |  |
|  |  | Equivalent ratio of A and C NCO/OH | 1.34 | 1.33 | 1.54 | 1.30 | 1.32 | 1.28 | 1.59 |
|  |  | Weight ratio A/C | 1.00 | 1.00 | 1.00 | 1.00 | 2.00 | 1.00 | 0.83 |
|  |  | Weight ratio D/B | 0.01 | 0.05 | 0.49 | 0.05 | 0.06 | 0 | 0 |
| Evaluation |  | Abrasion resistance | Δ (Grade 3) | ○ (Grade 4) | Δ (Grade 3) | ○ (Grade 4) | ○ (Grade 4) | ○ (Grade 4) | ○ (Grade 4) |
|  |  | Flex durability at low temperature | ○ (Grade 4) | Δ (Grade 3) | ○ (Grade 4) | ○ (Grade 4) | ○ (Grade 4) | ○ (Grade 4) | ○ (Grade 4) |
|  |  | Fastness to light | ○ (Grade 4) | ○ (Grade 4) | Δ (Grade 3) | ○ (Grade 4) | ○ (Grade 4) | ○ (Grade 4) | ○ (Grade 4) |

TABLE 5

|  |  |  | Comparative Example |  |  |  |  |  |  |  |  |  |
|---|---|---|---|---|---|---|---|---|---|---|---|---|
|  |  |  | 1 | 2 | 3 | 4 | 5 | 6 | 7 | 8 | 9 | 10 |
| A |  | Urethane polyisocyanate prepolymer | A7 | A8 | A2 | A1 | A9 | A1 | A1 | A1 | A1 | A9 |
|  |  | Number average molecular weight | 10300 | 5200 | 3570 | 3250 | 2500 | 3250 | 3250 | 3250 | 3250 | 2500 |
|  |  | Equivalent ratio (NCO/OH) | 1.50 | 7.04 | 3.52 | 3.52 | 3.52 | 3.52 | 3.52 | 3.52 | 3.52 | 3.52 |
|  |  | Amount (parts) | 100 | 100 | 100 | 100 | 100 | 100 | 100 | 100 | 100 | 100 |

TABLE 5-continued

|   |   |   | Comparative Example | | | | | | | | | |
|---|---|---|---|---|---|---|---|---|---|---|---|---|
|   |   |   | 1 | 2 | 3 | 4 | 5 | 6 | 7 | 8 | 9 | 10 |
| C | B | Urethane polyol prepolymer | B7 | B8 | B9 | B2 | B5 |  | B1 | B1 | B10 | B1 |
|   |   | Number average molecular weigh | 24400 | 7400 | 7800 | 3512 | 10300 |  | 8086 | 8086 | 2100 | 8086 |
|   |   | Equivalent ratio (NCO/OH) | 0.90 | 0.10 | 0.60 | 0.30 | 0.20 |  | 0.60 | 0.60 | 0.20 | 0.60 |
|   |   | Amount (parts) | 100 | 50 | 96 | 25 | 196 |  | 150 | 50 | 60 | 100 |
|   | D1 | Polyol |  | PTGM500 |  |  |  | C2090 |  |  |  |  |
|   |   | Molecular weight |  | 500 |  |  |  | 2000 |  |  |  |  |
|   |   | Amount (parts) |  | 50 |  |  |  | 100 |  |  |  |  |
|   | D2 | Polyol |  |  | 1,4-BD | 1,4-BD | 1,4-BD |  |  |  |  |  |
|   |   | Molecular weight |  |  | 90 | 90 | 90 |  |  |  |  |  |
|   |   | Amount (parts) |  |  | 4 | 5 | 4 |  |  |  |  |  |
|   | Equivalent ratio of A and C NCO/OH | | 1.19 | 1.80 | 1.31 | 1.32 | 1.29 | 1.81 | 1.45 | 2.21 | 1.29 | 1.93 |
|   | Weight ratio A/C | | 1.00 | 1.00 | 1.00 | 3.33 | 0.50 | 1.00 | 0.67 | 2.00 | 1.67 | 1.00 |
|   | Weight ratio D/B | | 0 | 1.00 | 0.04 | 0.20 | 0.02 | — | 0 | 0 | 0 | 0 |
| Evaluation | Abrasion resistance | | Application NG | X (Grade 1) | ○ (Grade 4) | ○ (Grade 4) | X (Grade 1) | X (Grade 1) | X (Grade 2) | ○ (Grade 4) | ○ (Grade 4) | ○ (Grade 4) |
|   | Flex durability at low temperature | | X (Grade 2) | Δ (Grade 3) | X (Grade 2) | ○ (Grade 4) | X (Grade 2) | Δ (Grade 3) | X (Grade 2) | X (Grade 2) | X (Grade 2) | X (Grade 1) |
|   | Fastness to light | | ○ (Grade 4) | X (Grade 2) | ○ (Grade 4) | ○ (Grade 4) | X (Grade 2) | ○ (Grade 4) | ○ (Grade 4) | ○ (Grade 4) | ○ (Grade 4) | ○ (Grade 4) |

As shown in Tables 3 to 5, as compared with the artificial leathers according to the Comparative Examples, the artificial leathers according to the Examples simultaneously satisfied abrasion resistance and flex durability at low temperature, and furthermore, regarding fastness to light, good results were obtained.

Based on excellent abrasion resistance, flex durability at low temperature and fastness to light, the artificial leather according to the present invention can be applied in various uses in which artificial leather is conventionally and generally used, including clothes, bags, shoes, interior materials and the like, and its use is not particularly limited.

The invention claimed is:

1. An artificial leather comprising a protective layer comprising a polyurethane resin, a surface layer comprising a polyurethane resin, and a fibrous substrate, successively laminated,
    wherein the polyurethane resin forming the surface layer is obtained by reacting a urethane polyisocyanate prepolymer (A) and a polyol component (C) containing a urethane polyol prepolymer (B),
    the urethane polyisocyanate prepolymer (A) is obtained by reacting a polyisocyanate and a polyol in an equivalent ratio (isocyanate groups of polyisocyanate/hydroxyl groups of polyol) of from 2.0 to 6.0, and has a number average molecular weight of from 3,000 to 30,000,
    the urethane polyol prepolymer (B) is obtained by reacting a polyisocyanate and a polyol containing a polycarbonate polyol in an equivalent ratio (isocyanate groups of polyisocyanate/hydroxyl groups of polyol) of from 0.2 to 0.8, and has a number average molecular weight of from 3,000 to 30,000,
    an equivalent ratio between the urethane polyisocyanate prepolymer (A) and the polyol component (C) (isocyanate groups of (A)/active hydrogen groups of (C)) is from 1.01 to 2.0, and
    a weight ratio between the urethane polyisocyanate prepolymer (A) and the polyol component (C) (weight of (A)/weight of (C)) is from 0.7 to 2.0.

2. The artificial leather according to claim 1, wherein the polyol component (C) comprises the urethane polyol prepolymer (B) and at least one active hydrogen compound (D) selected from the group consisting of a low molecular polyol (D1) having a number average molecular weight of from 500 to 2,000 and a chain extender (D2) having a molecular weight of 400 or less and having at least two active hydrogen groups in one molecule,
    wherein a weight ratio between the active hydrogen compound (D) and the urethane polyol prepolymer (B) (weight of (D)/weight of (B)) is from 0.01 to 1.0.

3. The artificial leather according to claim 2, wherein the chain extender (D2) is a polyhydric alcohol having a molecular weight of 400 or less.

4. The artificial leather according to claim 1, wherein the weight ratio (weight of (A)/weight of (C)) is from 0.8 to 1.8.

5. The artificial leather according to claim 1, wherein the urethane polyisocyanate prepolymer (A) has a melt viscosity at 80° C. of 50,000 cps or less.

6. The artificial leather according to claim, 1, wherein the urethane polyol prepolymer (B) has a melt viscosity at 80° C. of 50,000 cps or less.

7. The artificial leather according to claim 1, wherein the urethane polyisocyanate prepolymer (A) is obtained by reacting a polyisocyanate and a polyol in an equivalent ratio of from 3.0 to 4.5.

8. The artificial leather according to claim 1, wherein the urethane polyisocyanate prepolymer (A) is obtained by reacting a polyisocyanate and a polyol containing a polyether polyol.

9. The artificial leather according to claim 1, wherein the urethane polyisocyanate prepolymer (A) is obtained by reacting 4,4'-diphenylmethane diisocyanate and a polyol containing a polyether polyol.

10. The artificial leather according to claim 1, wherein the urethane polyol prepolymer (B) is obtained by reacting a polyisocyanate and a polyol in an equivalent ratio of from 0.3 to 0.6.

11. The artificial leather according to claim 1, wherein the urethane polyol prepolymer (B) is obtained by reacting 4,4'-diphenylmethane diisocyanate and a polyol containing a polycarbonate polyol.

12. The artificial leather according to claim 1, wherein the equivalent ratio between the urethane polyisocyanate prepolymer (A) and the polyol component (C) is from 1.2 to 1.4.

13. The artificial leather according to claim 1, wherein the surface layer is a porous layer by a carbon dioxide gas generated by reacting the urethane polyisocyanate prepolymer (A) with moisture in the atmosphere.

14. The artificial leather according to claim 2, wherein the low molecular polyol (D1) is at least one selected from the group consisting of a polycarbonate polyol and a polyether polyol.

15. The artificial leather according to claim 1, wherein the protective layer comprises a polycarbonate type polyurethane resin.

\* \* \* \* \*